United States Patent [19]

Minase et al.

[11] Patent Number: 5,148,966
[45] Date of Patent: Sep. 22, 1992

[54] METHOD FOR PRODUCING OUTER SKIN FOR ELECTRIC DEPOSITION FOIL PRODUCING DRUM

[75] Inventors: Akira Minase; Kinzo Murayama, both of Joetsu, Japan

[73] Assignee: Nippon Stainless Steel Kozai Co., Ltd., Niigata, Japan

[21] Appl. No.: 700,239

[22] Filed: May 15, 1991

[30] Foreign Application Priority Data

Feb. 14, 1991 [JP] Japan ................................. 3-42671

[51] Int. Cl.⁵ ............................................ B23K 31/02
[52] U.S. Cl. ................................... 228/149; 228/165; 228/174; 228/175; 228/225; 29/895.3
[58] Field of Search ............... 228/149, 155, 156, 165, 228/173.1, 174, 175, 225, 226, 231; 29/895.3

[56] References Cited

U.S. PATENT DOCUMENTS

| | | | |
|---|---|---|---|
| 3,619,548 | 11/1971 | Cavagnero | 228/165 |
| 4,080,704 | 3/1978 | Blakesley | 228/165 |
| 4,240,894 | 12/1980 | Adler | 204/281 |
| 4,459,062 | 7/1984 | Siebert | 228/165 |

FOREIGN PATENT DOCUMENTS

| | | |
|---|---|---|
| 58-24507 | 5/1983 | Japan . |
| 61-60149 | 12/1986 | Japan . |
| 62-233 | 1/1987 | Japan . |
| 2-243790 | 9/1990 | Japan . |

Primary Examiner—Samuel M. Heinrich
Attorney, Agent, or Firm—Sughrue, Mion, Zinn Macpeak & Seas

[57] ABSTRACT

A method is disclosed for producing an electric deposition foil producing drum for producing an electrically deposited metallic foil having a high quality. An opening tip end portion (14) opened toward the inside is formed in an inner surface portion of a joint portion (13) of an outer skin (12) made from a planar material in the form of a cylinder. The opening end portion (14) is welded from inside, and subsequently, the welded portion (15) and a portion close to the welded portion are bulged outwardly. A layer is welded in a recess (17) formed by the bulging work while cooling the outer surface of the outer skin. Subsequently, the welded layer is peened under a hot or cold work. Subsequently, the peened portion (18) is annealed. It is possible to obtain further advantages by using a welding means which does not require a welding rod for the welding of the joint portion (13).

4 Claims, 6 Drawing Sheets

A'

B'

C'

FIG. 10A"
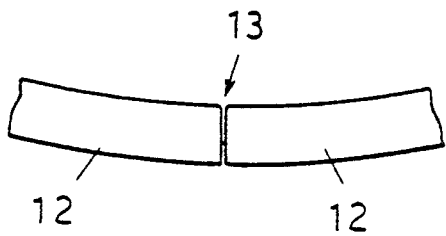
FIG. 10B"
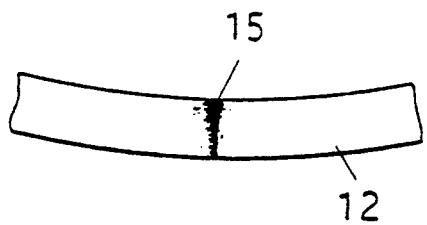
FIG. 11
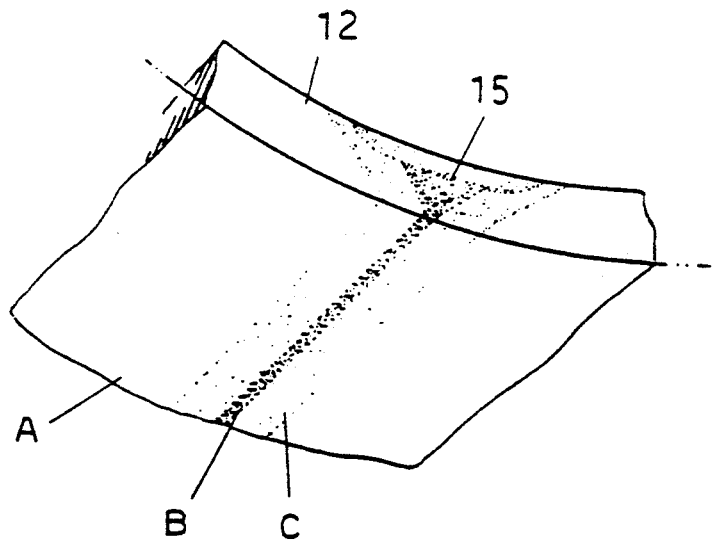

METHOD FOR PRODUCING OUTER SKIN FOR ELECTRIC DEPOSITION FOIL PRODUCING DRUM

BACKGROUND OF THE INVENTION

The present invention relates to a method for producing an outer skin for an electric deposition foil producing drum used for producing metallic foils such as copper foil, ferric foil and stainless steel foil through the electric deposition.

An electric deposition foil producing drum of such a type is known from Japanese patent Examined Publication No. 58-24507, Japanese Patent Examined Publication Nos. 61-60149 and 62-233, and Japanese Patent Unexamined Publication No. Hei 2-243790.

FIGS. 1 to 3 show a typical example of an electric deposition foil producing apparatus. An outer skin 2 made of titanium in the form of a cylinder is shrink-fitted to an outer circumferential surface of an inner drum 1 made of carbon steel or the like to thereby form an electric deposition drum a. A shaft b of the deposition drum a is rotatably supported by bearings c and d. A rotational power source is connected to the shaft b. A lower part of the deposition drum a is dipped into an electrolyte liquid f of an elecctrolyte bath e. An anode g is disposed in the electrolyte bath e. Using the electric deposition drum a as a cathode, an electric supply is effected between the electric deposition drum a and the anode g through a ring h and the shaft b. An electric current flows through a path from the outer skin 2 to the inner drum 1 through a fit interface i, and during a period when the electric deposition drum a is being dipped into the electrolyte liquid f upon the rotation thereof, a metallic foil that is a deposition material j is deposited on the outer circumferential surface of the outer skin 2. The metallic foil is peeled away from the outer circumferential surface of the deposition drum a. Thus, the coutinuous production is possible.

The outer skin 2 is made by winding a planar material of titanium in the form of a cylinder and welding opposite edges of the planar material through a TIG welding or a plasma welding. This is finished by the cutting and grinding processes.

However, the prior art plate-splicing welding portion 3 of the outer skin 2 is left without any treatment. This plate-splicing welding portion 3 of the outer skin 2 of pure titanium shown in FIG. 4 was observed (anywhere the surface was mirror-ground and errooded and its metallic formation was photographed). As a result, it was found that there was a significant contrast among a base material portion A', a thermally affected portion B' and a welded portion C'. This was due to the fact that, whereas the base material portion A' had a smooth surface, the thermally affected portion B' and the welded portion C' had the rough surfaces.

On the scale of 100 times, it was observed that the base material portion A' was shown in a microscopic picture of FIG. 5, the thermally affected portion b' was shown in a microscopic picture of FIG. 6 and the welded portion C' was shown in a microscopic picture of FIG. 7. It was found that the surface formation of the base material portion A' was an isoaxial d crystal as a rolled annealed formation, the surface formation of the thermally affected portion B' was a rough planar d crystal and the surface formation of the welded portion C' was a sawtoothed d crystal. The reason for this is that the base material portion A' was a uniformly intimate or fine formation, whereas the thermally affected portion B' and the welded portion C' are a deformed rough formation due to the thermal effects of the welding operation.

For this reason, the electric deposited metallic foil produced by the electric deposition foil producing drum using the outer skin 2 was a corrugated rough one at the plate splicing welded portion. There was a fear that it was impossible to use it as the printed circuit board due to a cut or short-circuit. This would lead to the reduction of yield as well as the difficulty in producing the continuous foil.

In order to solve this problem, the above-described Japanese Patent Unexamined Publication No. Hei 2-243790 discloses the method for producing a titanium outer skin for the electric deposition foil producing drum. However, the plate splicing welding thereof is attained by a method in which an inverted V-shaped opening portion opens toward the outside of the spliced portion of the outer skin and wherein the welding is effected from the outside of the outer skin.

SUMMARY OF THE INVENTION

An object of the present invention is to provide an electric deposition foil producing drum, which is superior to the prior art by the welding from the inside and a further improved method.

According to a first aspect of the invention, there is provided a method for producing an outer skin for an electric deposition foil producing drum, including the steps of winding, into a cylinder, an outer skin of a planar material made from at least one of a group of materials essentially consisting of titanium, niobium and tantalum, and forming an outer skin, spliced and welded with outer faces of the planar material being abutted with each other, around an outer surface of an inner drum, the method comprising the following steps: forming a V shaped opening tip portion, opened toward an inside, in an inner surface portion of the joint portion of the planar material of the outer skin; welding the end faces of the joint portion at the opening tip portion from the inside; subsequently projecting the welded portion and a portion in the vicinity of the welded portion from the inside to the outside by a bulging or extruding work to form a bulged portion; subsequently welding a recess portion inside of the bulged portion while cooling an outer surface of the bulged portion; peening the outer surface of the bulged portion under a hot or cold working to correct a thickness of the bulged portion so as to be the same thickness of a base material of the outer skin; and subsequently annealing the peened portion.

According to second aspect of the invention, there is provided a method for producing an outer skin for an electric deposition foil producing drum, including the steps of winding, into a cylinder, an outer skin of a planar material made from at least one of the group essentially consisting of a titanium, niobium and tantalum, and forming an outer skin, spliced and welded with its outer faces of the planar material being abutted with each other, around an outer surface of an inner drum, the method comprising the following steps of: forming a V shaped opening tip portion, opened toward an inside, in an inner surface portion of the joint portion of the planar material of the outer skin; welding the end faces of the joint portion at the opening tip portion from the inside; subsequently welding a layer on the inner surface of the welded portion while cooling an outer surface of the welded portion; subsequently extruding or bulging the welded layer portion from the inside to form a bulged portion on the outer surface; subsequently keening the outer surface of the bulged portion under a hot or cold working to correct the thickness of the joint portion to the same thickness of a base material of the skin layer; and subsequently annealing the peened portion.

According a third aspect of the invention, there is provided a method wherein the welding of the joint portion of the end faces of the planar material of the outer skin is performed from the inside to the outside of the joint portion without any opening tip portion by a welding means which does not use a welding rod, as for example, plasma welding.

BRIEF DESCRIPTION OF THE DRAWINGS

In the accompanying drawings:

FIGS. 10A" and 10B" show a part of a series of steps according to a third embodiment of the invention;

FIG. 11 is a view showing a joint portion of an outer skin according to the invention.

DETAILED DESCRIPTION OF THE PREFERRED EMBODIMENTS

Figure 1:
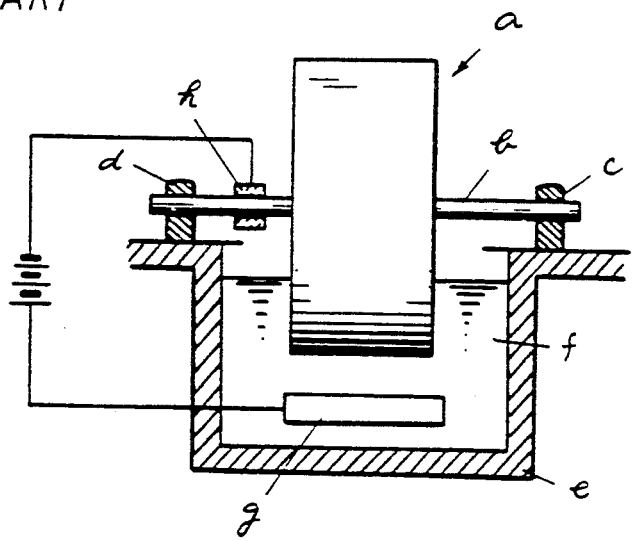
FIG. 1 is a schematic view showing an electric deposition foil producing drum of an electric deposition foil producing apparatus.
Figure 2:
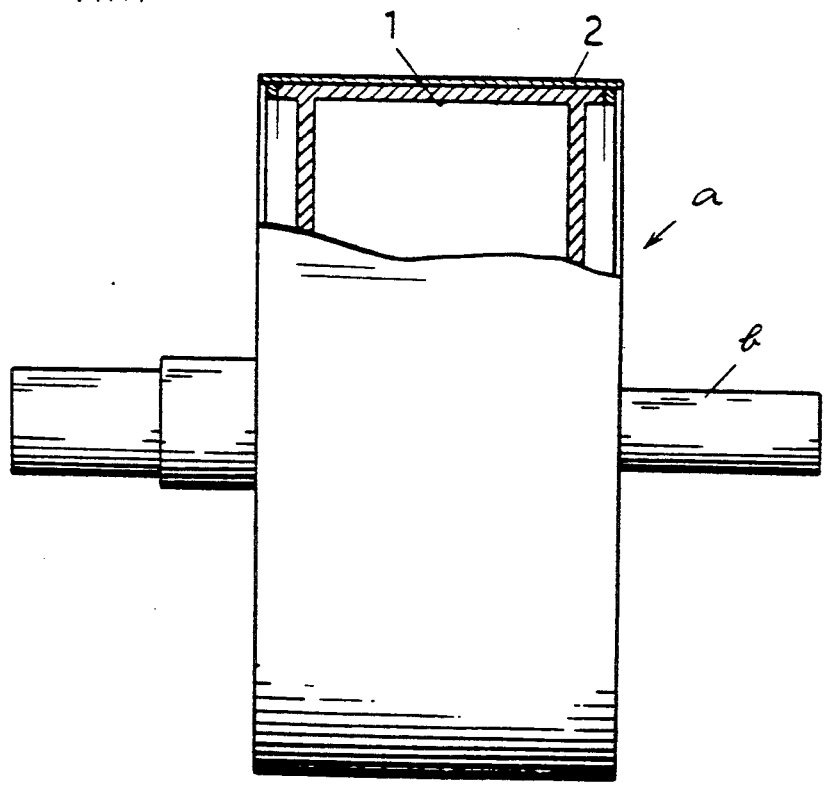
FIG. 2 is a partially fragmentary view showing the electric deposition foil producing drum.

The present invention will now be described with reference to the accompanying drawings.

A first aspect of the invention will be explained with reference to FIG. 8. An opening tip portion 14 opened toward an inner surface of an outer skin 12 is formed and is subjected to a first welding. Accordingly, the width of the welded portion thereof appearing on the outer surface of the outer skin 12 is smaller than that of the welded portion in the case where the welding is effected at an opening tip portion in the form of an inverted V opened toward the outer surface of the outer skin 12. As a result, according to the first aspect of the invention, it is possible to reduce the width of the thermally affected portion by the welding on the outer surface of the outer skin where the foil is deposited.

Also, after the opening tip portion 14 has been welded, an extrusion work is effected from the inside to the outside so that an inner concave portion 17 is deformed for facilitating the embedding welding of the concave portion on the inside. On the outside, the welded portion 15 and a bulged portion 16 for improving the formation in the vicinity of the welded portion 15 are formed.

The embedding welded portion at the concave portion will become a secondary welded layer 19 for peening work and is the inner welded portion. The deformation of the formation of the outer surface of the outer skin 12 where the foil is deposited is suppressed because of the inner welding and cooling of the outer surface.

The bulged portion 16 is subjected to a hot or cold peening work so that the thickness of the bulged portion 16 is corrected in conformity with that of the base material. Subsequently, in order to effect the anneal treatment, the welded portion 15 and the portion in the vicinity of the welded portion 15 are recrystallized so as to be fine and regulated in particle size to have substantially the same crystal granulation as that of the base material. The hardness of the hardened portions which has been subjected to the work will be reduced to the same extent as that of the base material.

A second aspect of the invention will now be briefly described (see FIG. 9).

In contrast to the first aspect of the invention, in the second-aspect of the invention, the order of the step of peening the joint portion 13 and the step of embedding the recess is reversed. Namely, according to the second aspect of the invention, the layer welding is effected on the inner surface of the joint portion 13, and thereafter, the bulged portion 16 is formed from the inside to the outside by the extruding work. The same effect as that of the first aspect may be ensured.

A third aspect of the invention will now be briefly described (see FIG. 10).

The use of a welding treatment which does not require a welding rod, such as plasma welding, makes it possible to reduce the difference in composition between the welded portion 15 and the base material to a great extent. As a result, it is possible to effect the regulated fine granulation substantially equal to that of the first and second aspects of the invention, to thereby obtain an outer skin 12 that has more uniformity in composition among the welded portion 15, the portion close to the welded portion 15 and the base material.

The invention will be described in more detail by way of the embodiments shown in FIGS. 8 through 10.

The first embodiment of the invention in which a titanium is used in the formation improving treatment will be described with reference to FIGS. 8A through 8F.

Figure 8A:
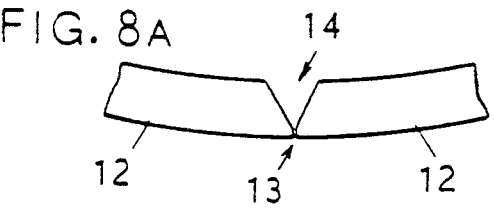
FIGS. 8A to 8F show a series of steps according to a first embodiment of the invention.

In FIG. 8A, a V-shaped opening tip portion 14 which is opened inwardly of a joint portion 13 of plate ends of an outer skin 12 made of titanium is formed.

Figure 8B:
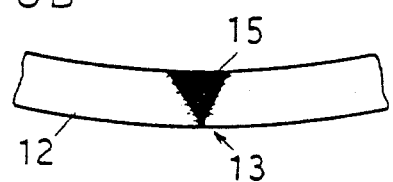

In FIG. 8B, a first welding treatment is effected to the plate ends of the opening tip portion 14. Incidentally, the welding treatment should be effected by using a welding rod having the same quality as that of the base material under an oxidation preventing circumstances as in the inactive gas atmosphere. A width of the welded portion 15 exposed in the outer surface of the outer skin 12 is small because the opening tip is V-shaped. The width of the outer surface of the outer skin 12 to be thermally affected by the welding is thereby narrowed.

Figure 8C:
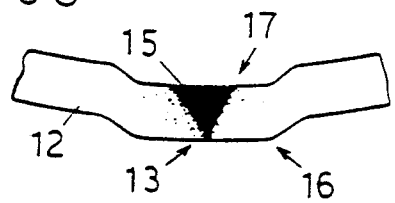

In FIG. 8C, in order to effect, with a working rate of an 80% or more, the welded portion 15 and the portion close to the welded portion 15 which have the deformed formation and roughed formation to be described later, the portions are extruded from the inside to the outside by the extrusion work to form a bulged portion 16. The extrusion work is effected from one end to the other end of the outer skin 12 by an extruding unit including a receiving die having a predetermined recess and an extruding die having an associated convex surface. It should be noted that it is possible to extrude the joint portion 13 effectively at once instead of orderly extruding the outer skin 12 from its one end to the other end. In this case, it is preferable to perform the extrusion work to meet the following relationship:

$$\{H/(T+H)\} \times 100\% \geq 20\% \tag{1}$$

where T is the thickness of the outer skin and H is the radial displacement of the extrusion work.

The extrusion work is effected in order to obtain a plate thickness with a fine granulation in the thermally affected portion by the welding and the welded portion. The reason for meeting the above relationship is that it would be impossible to obtain an effect of the fine granulation and regularization of the crystallization of the thermally affected portion and the welded portion 15 if the working rate would be less than 20% in case of the outer skin 12 made of titanium.

Figure 8D:
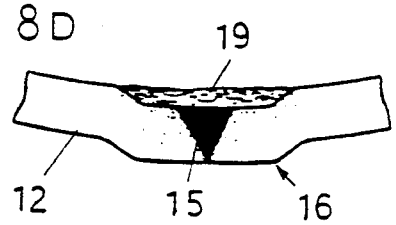

In FIG. 8D, subsequently, the embedding welding of the recess is effected in the inner recess 17 of the bulged portion 16 while the outer surface of the bulged portion 16 is being cooled, thereby forming a secondary welded layer 19. In this case, the reason for cooling the outer surface of the bulged portion 16 is to reduce the thermally affected portion due to the embedding welding of the recess.

Figure 8E:
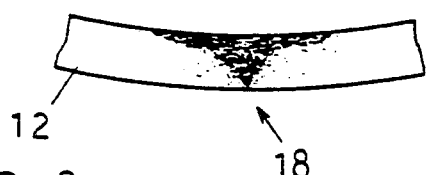

In FIG. 8E, subsequently, the outer surface of the bulged portion 16 is subjected to a hot or cold peening work to impart a working strain to the bulged portion 16 of the outer skin 12 (i.e., the welded portion 15 and the thermally affected portion) to obtain a thickness substantially equal to that of the base material. The bulged portion 16 is pressed by using a support base plate and a press die to correct the worked portion so as to have a thickness substantially equal to that of the base material. The peening work is effected from one end to the other end of the outer skin 12. It is possible to press the workpiece by using any means such as rolling means, an air hammer and the like. It is to be noted that it is possible to use the effective means also in the peening work in the same manner as that of the foregoing extrusion treatment. Through the peen work, the remarkable working strain is imparted to the welded portion 15 or the portion in the vicinity of the welded portion 15.

Figure 8F:
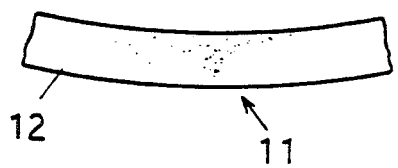

In FIG. 8F, the peened portion 18 is heated and annealed at 600° to 700° C. to improve and finely granulate the crystalline particles of the rough formation of the spliced welded portion 15 and the portion in the vicinity of the welded portion 15, i.e., the thermally affected portion. Reference numeral 11 denotes the annealed portion.

The spliced portion joint 13 of the outer skin 12 made of titanium and produced by the method in accordance with the first embodiment is recrystallized through the working and the thermal treatment so that the base material and the joint portion 13 are regularized in crystalline granulation, hardness and the like while keeping the thickness uniform. In the case of the outer skin 12 according to the embodiment, the crystalline granulation is Nos. 6 to 9 of ASTME112, and the hardness of the base material and the joint portion 13 is less than Hv25 (Vickers hardness). The quality of the spliced joint portion 13 is very similar to that of the base material.

The surfaces of the respective parts of the outer skin shown in FIG. 11 were observed through a microscope under the similar condition as that of the conventional structure. The surface formation of the base material 1 was shown in the picture of FIG. 12, the surface formation of the thermally affected portion B was shown in a picture of FIG. 13 and the surface formation of the welded portion C was shown in FIG. 14. From these pictures, it was found that the thermally affected portion B and the welded portion C had the isoaxial structure as in the base material A. The rough granular formation and the deformed formation of the thermally affected portion B and the welded portion C due to the thermal effect during the welding were finely granulated or regulated so that the formations of these portions were similar to the formation of the base material A. Accordingly, if the outer skin 12 was used, unlike the conventional examples, it was possible to suppress the roughness of the surface of the welded portion 15 in the producing steps for the foil and it was possible to continuously produce the foil having a high quality and to enhance a yield of the foil. Unlike the disclosure of the conventional system shown in the foregoing Japanese patent Unexamined publication No. Hei 2-243790 in which the welded portion 15 is directly struck or pressed without any other step, the outer skin 12 in accordance with the embodiment of the invention is subjected to the extrusion work, a layer welding work and the annealing work so that the quality of the welded portion, the thermally affected portion and the base material is made uniform.

The formation improving process in accordance with a second embodiment of the invention will now be described in detail with reference to FIGS. 9A to 9F. In the second embodiment in contrast to the first embodiment, the steps of extrusion and embedding of the recess are reversed. Namely, in the second embodiment, the layer welding is effected on the inner side of the welded portion 15 and the portion close to the welded portion 15, and the bulged portion 16 is formed from the inside to the outside by the extrusion work. The effects of respective working steps are the same as those of the first embodiment.

Figure 9A:
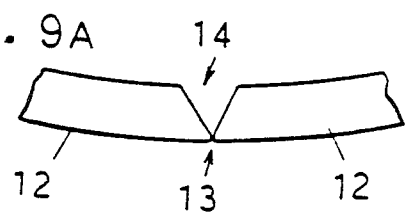
FIGS. 9A to 9F show a series of steps according to a second embodiment of the invention.

FIG. 9A is the same as FIG. 8A.

Figure 9B:
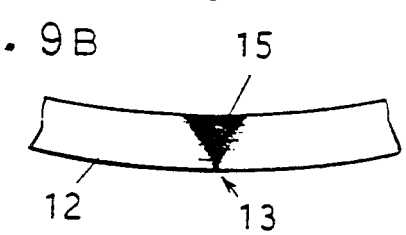

FIG. 9B is the same as FIG. 8B.

Figure 9C:
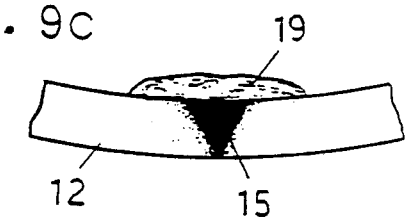

FIG. 9C shows a step in which a secondary layer 19 is formed at the welded portion 15 and the portion in the vicinity of the welded portion 15 inside of the outer skin while cooling the outer surface of the outer skin. In this case, the layer welding should be effected to meet the following relationship:

$$\{H'/(T'+H')\} \geq 20\% \tag{2}$$

where T' is the plate thickness of the outer skin 12 and H' is the height of the secondary welded layer 19.

This welded layer is formed to be an extra layer imparting a working strain for the purpose of making the welded portion 15 finely granulated. It is preferable that the width of the layer be the sum of the width of the primary welded portion and an extra length d, and the height be selected so that the working rate of the extrusion work is 20% or more.

Figure 3:
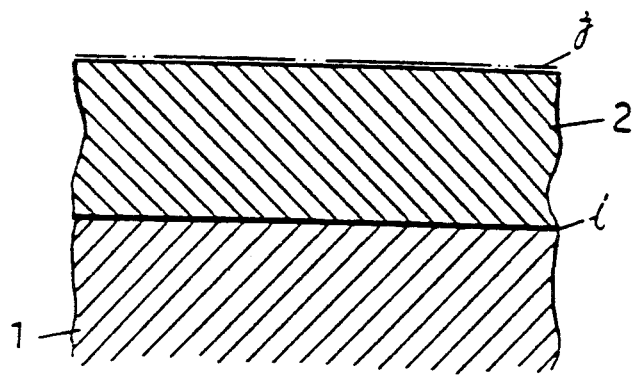
FIG. 3 is an enlarged cross-sectional view showing the deposited foil.
Figure 4:
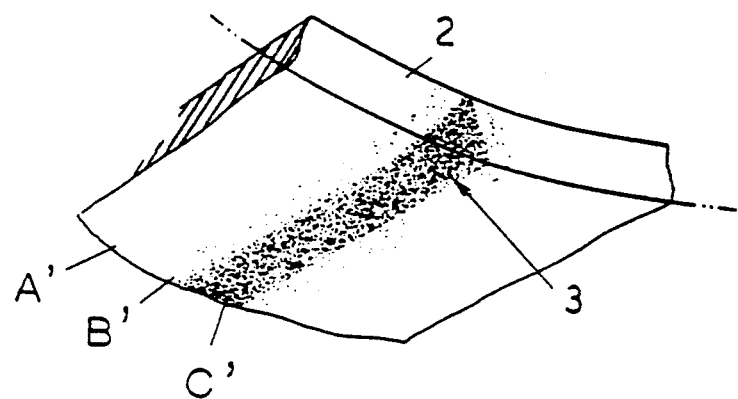
FIG. 4 is a partial perspective view showing a spliced joint portion of an outer skin according to the prior art.
Figure 5:
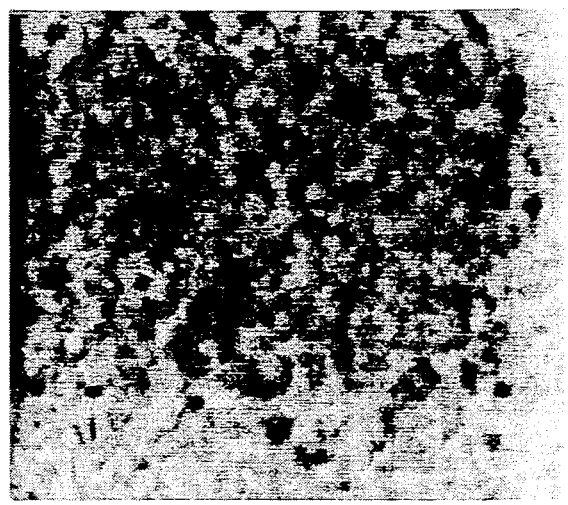
FIGS. 5, 6 and 7 are microscopic pictures showing a metallic formation in accordance with the prior art.
Figure 6:
Figure 7:
Figure 9D:
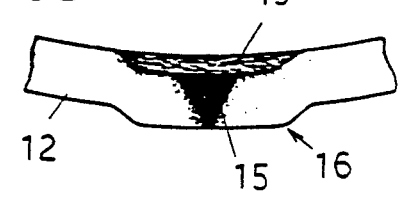

FIG. 9D shows a step in which the overall secondary welded portion 19 applied to the welded portion 15 and the portion in the vicinity of the welded portion 15 is extruded from the inside to the outside by the extrusion working, which is performed so that the welded layer is flush with the inner peripheral surface of the base material in alignment with an arcuate curve. In this case, in the same manner as in FIG. 3C, the following relationship should be met:

$$\{H''/(T''+H'')\} \geq 20\% \quad (3)$$

where T'' is the thickness of the outer skin 12 and H'' is the radial displacement through the extrusion work (which displacement is different from the height H' of the welded layer on the inside).

This extrusion work is performed in order to press the portion so as to be flush with the inner surface of the base material in alignment with the arcuate curve as much as possible and to make the crystal of the formation of the bulged portion 16 finely granulated or regulated by the subsequent keen working.

Figure 9E:
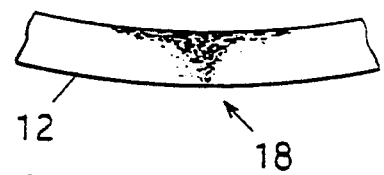

FIG. 9E shows the same step as that shown in FIG. 8E.

FIG. 8F shows the same step as that shown in FIG. 8F.

Figure 12:
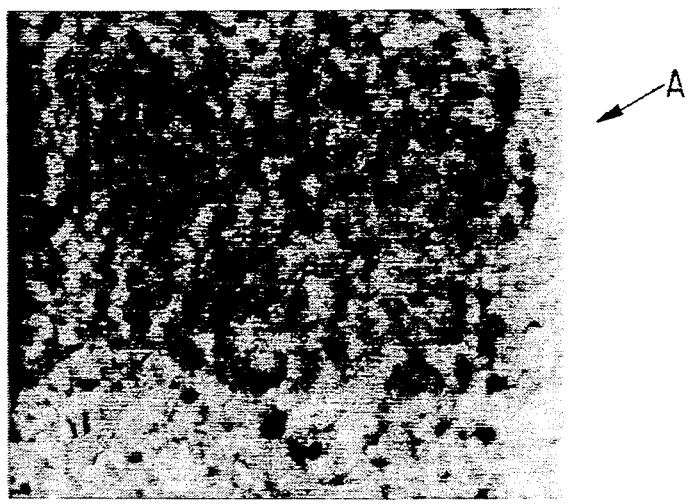
FIGS. 12 to 14 are pictures showing the formation of the invention.
Figure 13:
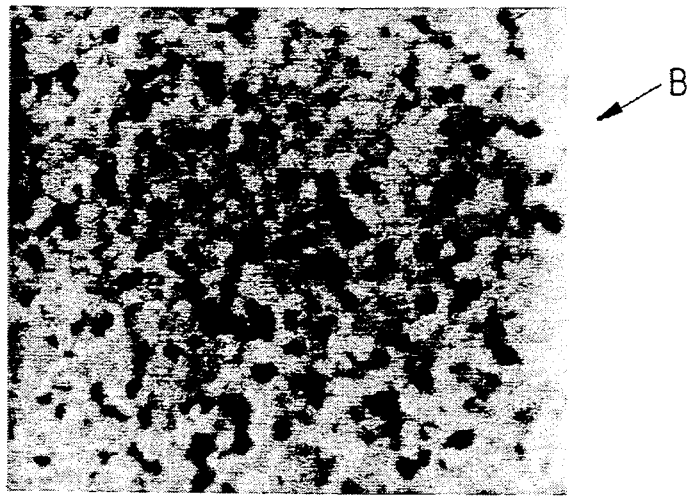
Figure 14:

The outer skin 12 made of titanium and produced in accordance with the second embodiment was observed as shown in FIGS. 12, 13 and 14 in which the deformed portion 13 of the joint portion 13 was well suppressed. The outer skin 12 was very similar to that in accordance with the first embodiment in hardness and crystalline granulation.

An improvement of the formation in accordance with third embodiment of the invention will now be described with reference to FIGS. 10A'' and 10B''.

FIG. 10A'' shows a step in which end faces of the joint portion 13 of the outer skin 12 are in abutment with each other without any opening tip portions.

FIG. 10B'' shows a step in which the joint portion 13 is welded by welding means which does not require a welding rod, as for example, in plasma welding.

According to the welding means, the difference in composition between the welded portion 15 and the base material is reduced as much as possible. Accordingly, it is possible to suppress the non-uniformity in hardness due to the difference in composition. In this case, there is no opening tip portion. As a result, the width of the welded portion is reduced as much as possible so that the thermally affected portion is as small as possible. It is possible to perform the granulate and regulate the particles of the material in accordance with the steps described in conjunction with the first and second embodiments. It is thus possible to obtain an outer skin 12 having the welded portion 15 and the portion in the vicinity of the welded portion 15 with a uniform quality.

The subsequent steps therefor are performed in the same way as those shown in FIGS. 8C, 8D, 8E and 8F of the first embodiment and FIGS. 9C, 9D, 9E and 9F of the second embodiment.

The outer skin 12 produced in accordance with the third embodiment was observed so that the deformed formation of the joint portion 13 was supported in the same manner as shown in FIGS. 12, 13 and 14 and the hardness and the crystalline granulation were made more uniform than the first embodiment.

The present invention exhibits the following advantages:

i) The joint portion is formed in the form of a letter V opened toward the inside and the embedding welding is applied to the recess, directed to the inside, of the joint portion. Thus, it is possible to reduce the width of the welded portion of the foil surface, i.e., the outer surface of the outer skin and to reduce the width of the thermally affected portion.

ii) The joint portion is once bulged or extruded toward the outside by the extrusion work to form a bulged portion which is again corrected to have the same thickness as that of the base material through the peening work. Subsequently, the annealing is effected. The formation deformed due to the welding is improved in hardness and quality similarly to the base material. It is possible to make the base material, the welded portion and the portion close to the welded portion uniform in quality in the outer skin.

iii) If the end faces of the joint portion are in abutment wih each other and are to be subjected to welding without the use of a welding rod, it is possible to make the joint portion further similar to the base material.

As described above, according to the present invention, since the outer skin has the uniform quality between the joint portion and the base material, it is possible to perform a production method for a good foil having a uniform quality.

What is claimed is:

1. In a method for producing an outer skin for an electric deposition foil producing drum, including the steps of winding, into a cylinder, an outer skin of a planar material made of at least one material selected from the group essentially consisting of a titanium, niobium and tantalum, and forming an outer skin, spliced and welded with end faces of the planar material being abutted with each other at a joint portion, around an outer surface of an inner drum, said method comprising the following steps of:

forming a V-shaped opening tip portion, opened toward an inside, in an inner surface portion of the joint portion of said planar material of the outer skin;

welding the end faces of said joint portion at the opening tip portion from the inside to form a welded portion;

subsequently projecting the welded portion and a portion in the vicinity of the welded portion from the inside to the outside by a bulging or extruding work to form a bulged portion and a recessed portion inside of said bulged portion;

subsequently welding said recessed portion while cooling an outer surface of said bulged portion;

peening the outer surface of said bulged portion under a hot or cold working so that a thickness of the bulged portion is corrected to conform with a thickness of the planar material of the outer skin; and subsequently annealing the peened portion.

2. In a method for producing an outer skin for an electric deposition foil producing drum, including the steps of winding, into a cylinder, an outer skin of a planar material made from at least one material selected from the group essentially consisting of a titanium, niobium and tantalum, and forming an outer skin, spliced and welded with end faces of the planar material being abutted with each other at a joint portion, around an outer surface of an inner drum, said method comprising the following steps of:

forming a V-shaped opening tip portion, opened toward an inside, in an inner surface portion of a joint portion of said planar material of the outer skin;

welding the end faces of said joint portion at the opening tip portion from the inside to form a welded portion;

subsequently welding a layer on the inner surface of the welded portion while cooling an outer surface of the welded portion;

subsequently extruding or bulging the welded layer portion from the inside to form a bulged portion on the outer surface;

subsequently peening the outer surface of the bulged portion under a hot or cold working so that a thickness of the bulged portion is corrected to conform with a thickness of the planar material of said outer skin; and subsequently annealing the peened portion.

3. In a method for producing an outer skin for an electric deposition foil producing drum, including the steps of winding, into a cylinder, an outer skin of a planar material made of at least one material selected from the group essentially consisting of a titanium, niobium and tantalum, and forming an outer skin, spliced and welded with end faces of the planar material being abutted with each other at a joint portion, around an outer surface of an inner drum, said method comprising the following steps of:

welding the joint portion of the end faces of the planar material of the outer skin from the inside to the outside of the joint portion by a welding apparatus which does not require a welding rod;

subsequently projecting the joint portion and a portion in the vicinity of the joint portion from the inside to the outside by a bulging or extruding work to form a bulged portion and a recessed portion inside of said bulged portion;

subsequently welding said recessed portion while cooling an outer surface of said bulged portion;

peening the outer surface of said bulged portion under a hot or cold working so that a thickness of the bulged portion is corrected to conform with a thickness of the planar material of the outer skin; and subsequently annealing the peened portion.

4. In a method for producing an outer skin for an electric deposition foil producing drum, including the steps of winding, into a cylinder, an outer skin of a planar material made from at least one material selected from the group essentially consisting of a titanium, niobium and tantalum, and forming an outer skin, spliced and welded with end faces of the planar material being abutted with each other at a joint portion, around an outer surface of an inner drum, said method comprising the following steps of:

welding the joint portion of the end faces of the planar material of the outer skin from the inside to the outside of the joint portion by a welding apparatus which does not require a welding rod;

subsequently welding a layer on the inner surface of the joint portion while cooling an outer surface of the joint portion;

subsequently extruding or bulging the welded layer portion from the inside to form a bulged portion on the outer surface;

subsequently peening the outer surface of the bulged portion under a hot or cold working so that a thickness of the bulged portion is corrected to conform with a thickness of the planar material of said outer skin; and subsequently annealing the peened portion.

* * * * *

UNITED STATES PATENT AND TRADEMARK OFFICE
CERTIFICATE OF CORRECTION

PATENT NO. : 5,148,966

DATED : September 22, 1992

INVENTOR(S) : Akira MINASE et al

It is certified that error appears in the above-identified patent and that said Letters Patent is hereby corrected as shown below:

Col. 1, line 63, change "d crystal" to -- $d$ crystal --;

line 65, change "d crystal" to -- $d$ crystal --; and line 67, change "d crystal" to -- $d$ crystal --.

Col. 6, line 59, change "extra length d" to --extra length $d$ --.

Figure 9F:
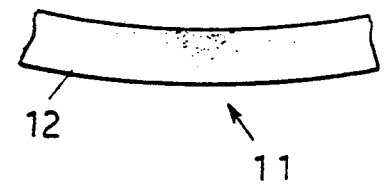

Col. 7, line 18, change "FIG. 8F" to --FIG. 9F--.

Signed and Sealed this

Thirtieth Day of November, 1993

Attest:

BRUCE LEHMAN

Attesting Officer

Commissioner of Patents and Trademarks